United States Patent [19]
Zimmerman

[11] 3,809,260
[45] May 7, 1974

[54] BOTTOM UNLOADER APPARATUS FOR SILOS

[76] Inventor: Harold M. Zimmerman, R.D. 1, Ephrata, Pa. 17522

[22] Filed: Nov. 6, 1972

[21] Appl. No.: 303,717

[52] U.S. Cl. ............................ 214/17 D, 222/228
[51] Int. Cl. ............................................. B65g 65/48
[58] Field of Search...... 214/17 D, 17 DA; 198/110; 222/228

[56] References Cited
UNITED STATES PATENTS
2,764,320  9/1956  Broberg et al. ............ 214/17 DA X
3,424,350  1/1969  Herr et al. ...................... 222/228 X Primary Examiner—Robert G. Sheridan
Attorney, Agent, or Firm—Holman & Stern

[57] ABSTRACT

A novel bottom unloader apparatus is disclosed for use in a silo of the type having a floor and upstanding sides. The unloader apparatus comprises an elongated shaft having a plurality of chain agitator devices thereon, the shaft being rotationally journalled within the silo about a substantially vertical axis, such that the shaft extends upwardly from the silo floor. At a lower end portion of the shaft, a drive gear means or sprocket is affixed thereto. A substantially laterally disposed conveyor mechanism extends between the shaft and a discharge outlet exterior of the silo, the conveyor mechanism in the preferred inventive embodiment being disposed in the silo floor and including an endless chain having a plurality of vanes thereon, the endless chain being disposed about the drive gear means or sprocket of the elongated shaft. A single drive means is provided to the outside of the silo and is coupled to the endless chain to advance same, selectively in a forward or reverse direction, so as to discharge silage, advancement of the endless chain simultaneously effecting rotation of the shaft so as to agitate silage downwardly toward the conveyor mechanism.

5 Claims, 3 Drawing Figures

BOTTOM UNLOADER APPARATUS FOR SILOS

BACKGROUND OF THE INVENTION

This invention generally relates to material transport mechanisms and particularly concerns a bottom unloader apparatus for silos.

Many unloading apparatus have been developed in the prior art for effecting the discharge of silage such as feed and grain from silos of the type having a floor and substantially vertically upstanding sides. The typical unloader apparatus is disposed at the bottom of such silos, the silos themselves being filled from the top. In this fashion, the oldest silage, i.e., the material near the bottom of the silo, is discharged from the silo storage mechanism first whereas the newer silage gradually makes its way downwardly towards the unloader apparatus. Silos of the type described incorporating a bottom unloader apparatus thus allow a continuous partial filling and emptying process.

The typical bottom silo unloader apparatus, however, is not without its disadvantages. For example, it is oftentimes necessary with prior art unloader constructions to provide a tunnel or chamber beneath the silo itself so as to house the unloader apparatus and related machinery. The provision of such a tunnel is an expensive undertaking. Further, with prior art construction physical access to the unloader device is oftentimes difficult, thus deleteriously affecting maintenance and repair of the mechanical parts.

Since bottom silo unloaders are typically disposed in and amongst the silage that is stored, heavy loads are placed upon the mechanical apparatus. Further, the typical bottom unloader apparatus is readily subject to jamming and clogging due to its physical disposition. In addition, the environment surrounding the bottom unloader apparatus is chemically adverse in that silage acid attacks the moving parts of the apparatus, thus shortening its life. On the whole, bottom silo unloading apparatus of prior art construction cannot offer economical and trouble-free operation.

BRIEF SUMMARY OF THE INVENTION

From the foregoing, it is apparent that a need exists for an improved bottom unloader apparatus which does not suffer from the disadvantages associated with prior art constructions. It is the primary objective of the instant invention to provide such an improved apparatus by which this need is satisfied.

A further objective of the instant invention is the provision of an improved bottom unloader apparatus which does not require the provision of a tunnel or chamber beneath the silo itself for the disposition of the mechanical parts.

Yet another objective of the instant invention concerns the provision of an improved bottom silo unloader apparatus of extremely simple and economical construction, having a minimal number of complex moving parts, and thus offering relatively maintenance-free operation.

Still another object of the instant invention concerns the provision of a bottom unloader apparatus constructed so as to necessitate the provision of but a single drive means therefor, the drive means itself being disposed exteriorly of the silo so as to facilitate access, maintenance, and repair.

A further objective of the instant invention concerns the provision of a bottom silo unloader apparatus which incorporates a conveyor mechanism of novel construction enabling the mechanism to be driven in a forward and a reverse direction so as to eliminate jamming and clogging, discharge of the silage being effected regardless of conveyor running direction.

These objects, as well as others which will become apparent as the description proceeds, are implemented by the instant invention which, as aforestated, comprises a novel bottom unloader apparatus for utilization in a silo of the type having a floor and upstanding sides. The bottom unloader apparatus comprises an elongated shaft having a plurality of agitator devices, such as flexible chains, attached thereto. The elongated shaft is preferably disposed centrally of the silo and is rotationally journalled therein so as to extend upwardly from the silo floor about a substantially vertical axis. A drive gear means, such as a chain sprocket, is affixed to the shaft adjacent a lower end portion thereof.

The unloader apparatus of the instant invention further incorporates a substantially laterally disposed conveyor mechanism which extends between the shaft and a discharge outlet exterior of the silo, the conveyor mechanism, in the preferred inventive embodiment, including an endless chain having a plurality of vanes thereon, the endless chain being disposed about the drive gear means or sprocket of the shaft. In the preferred construction, the laterally extending conveyor mechanism is actually disposed within the silo floor and a housing is disposed about the conveyor mechanism, adjustable door means being provided through the housing for metering a predetermined amount of silage to the conveyor mechanism. Adjustment of the door means or metering mechanism is effected exteriorly of the silo.

Finally, the bottom unloader apparatus of the instant invention incorporates a drive means, such as an electric motor, which is disposed exteriorly of the silo and which is coupled to the endless chain. Operation of the drive means or motor advances the endless chain so as to discharge silage, advancement of the endless chain simultaneously effecting rotation of the shaft so as to agitate silage downwardly toward the conveyor mechanism. Since the conveyor mechanism contemplated for use with the preferred inventive embodiment is of the endless chain/vane or paddle variety, the drive means can advance the chain in either a forward or a reverse direction, discharge of silage being effected regardless of chain advancement direction. This feature of the instant invention is advantageous in that clogging of the conveyor mechanism by the silage being discharged can be avoided or minimized, by reversing the conveyor drive direction.

BRIEF DESCRIPTION OF THE DRAWINGS

The invention itself will be better understood, and further features and advantages thereof will become apparent, from the following detailed description of the preferred inventive embodiment, such description making reference to the appended sheets of drawings, wherein.

DETAILED DESCRIPTION OF THE PREFERRED INVENTIVE EMBODIMENT

Figure 1:
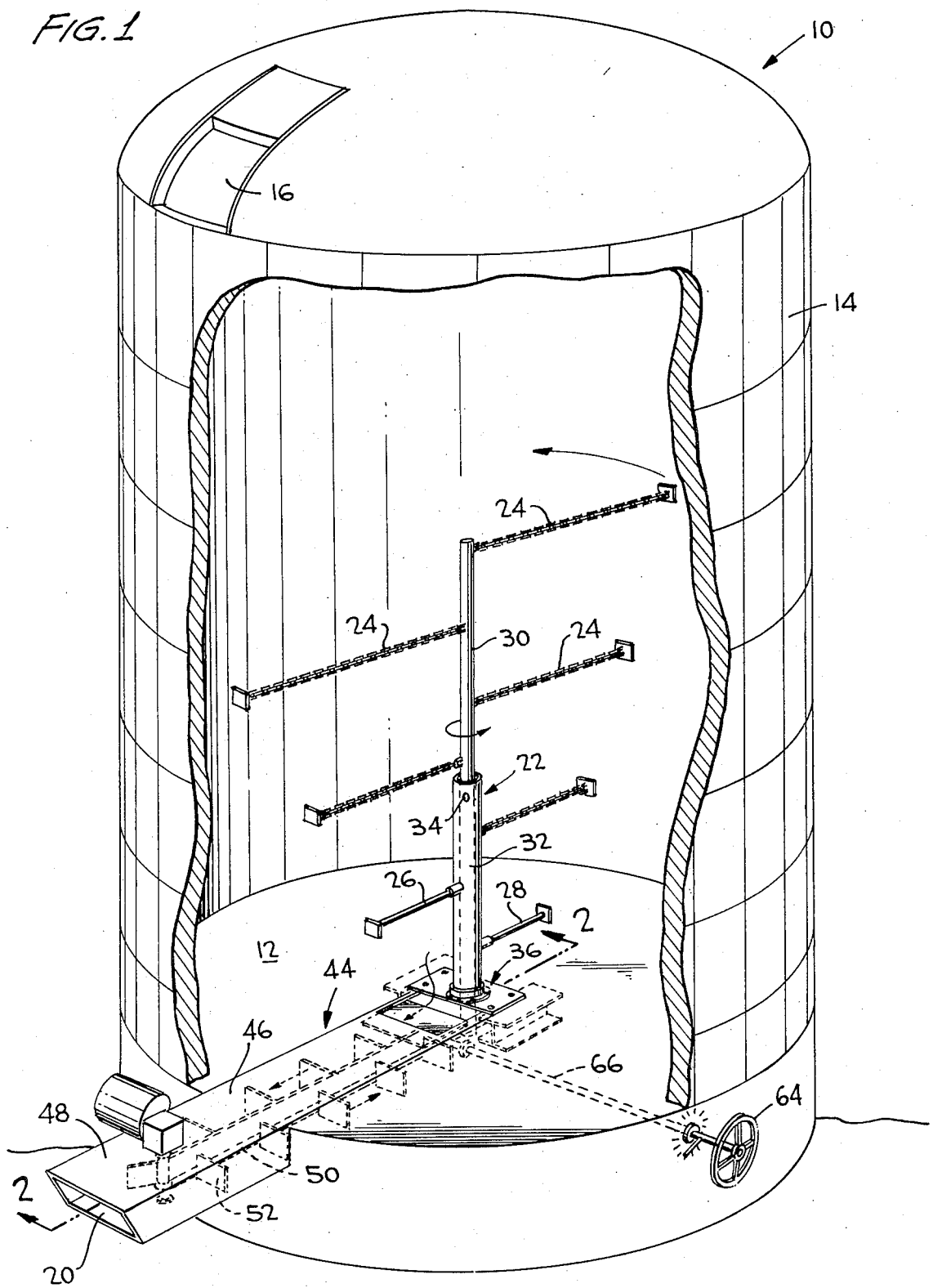
FIG. 1 is a perspective illustration, partially in section for illustrative clarity, of the improved bottom unloader apparatus of the instant invention mounted within a typical upright silo.

Referring now to the drawings, and particularly to FIG. 1 thereof, a perspective illustration of the novel bottom unloader apparatus of the instant invention can be seen disposed within a typical upright silo generally designated by reference numberal 10 of the type having a floor 12 such as of poured concrete, and upstanding side walls 14. The silo 10 includes an opening 16 in the top thereof into which silage such as feed, grain, and the like can be poured for storage. The silo 10 includes a discharge opening 20 at the bottom thereof, from which stored silage can be removed. Since the silage is filled from the top of the silo 10 and is removed from the bottom 20, the first silage or material into the silo 10 is likewise the first material removed therefrom. To effect such removal, the novel bottom unloader apparatus of the instant invention is utilized, as will be described in detail hereinbelow.

The bottom unloader apparatus of the instant invention incorporates an elongated shaft generally designated by reference numeral 22, the shaft having a plurality of agitator devices thereon, such as flexible chains 24 which are attached to the elongated shaft 22. For reasons which will become apparent as the description proceeds, the two lower-most agitator devices disposed on the elongated shaft 22 are not flexible, but are stiff pipes or rods, for example, which extend constantly outwardly from the central shaft 22, as at 26 and 28, respectively. The elongated shaft 22, in practice, can comprise a central shaft 30 disposed within a sleeve 32 which is keyed or otherwise affixed about the central shaft 30 by means of pin 34.

Mounting means generally designated by reference numeral 36 are provided for rotationally journalling the elongated shaft 22 within the silo, and preferably centrally thereof, about a substantially vertical axis such that the shaft 22 extends upwardly from the silo floor 12 as shown.

Figure 2:
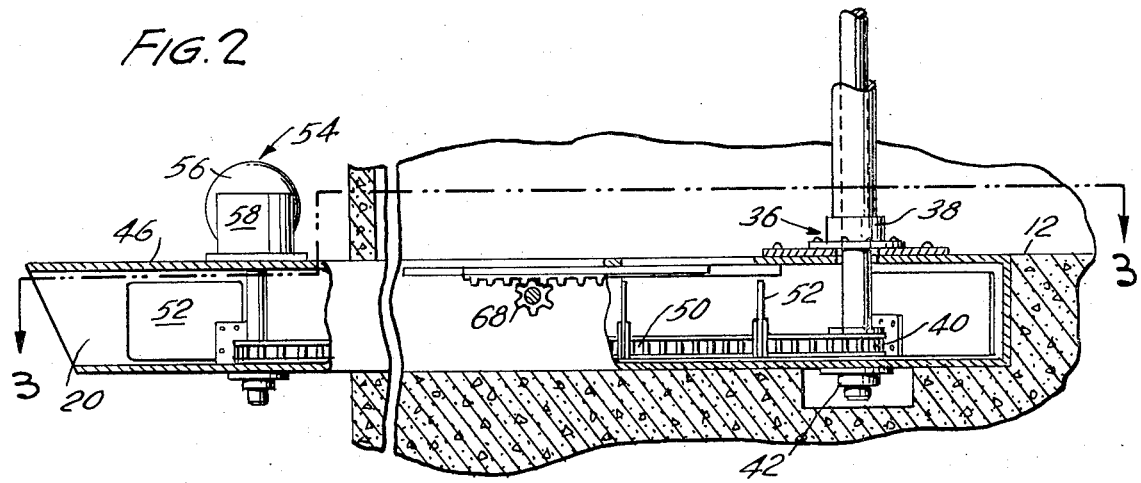
FIG. 2 is a side elevational view, in section, of the conveyor mechanism of the instant invention, said view being taken along lines 2—2 of FIG. 1.

In one preferred inventive embodiment, and with specific reference herein being made to FIG. 2 of the appended drawings, the mounted means could comprise a sleeve bearing 38 into which is disposed the outer sleeve 32 of the elongated shaft 22. The bearing 38 rotationally journals the sleeve 32 as well as supports the weight of shaft 22. The central shaft 30 is contemplated to extend downwardly through the outer sleeve 32 and, at a lower end portion thereof, a drive gear means or sprocket 40 is affixed. The end of the central shaft 30 is terminated beneath the floor 12 of the silo 10 at a bearing 42. As above-described, the central elongated shaft 22 is capable of free rotation about its central axis. As the central shaft 22 rotates, the agitating devices or chains 24 will swing upwardly and outwardly as is depicted in FIG. 1 due to centrifugal force. When rotation of the central elongated shaft 22 ceases, the flexible chains or agitator devices 24 will drop downwardly under gravity so as to hang loosely about the shaft. However, since the two lower-most agitator devices 26 and 28 are rigidly or stiffly constructed so as to extend outwardly from the shaft 22, these two agitator devices will not drop downwardly and therefore will not interfere with the underlying conveyor mechanism as will be discussed hereinbelow.

Disposed beneath the elongated central shaft 22, and preferably within a trough or channel in the floor 12 of the silo, is a substantially laterally disposed conveyor mechanism generally designated by reference numeral 44, the conveyor mechanism 44 extending between the shaft 22 and the discharge outlet 20 exterior of the silo. Conveyor mechanism 44 is preferably covered by a housing 46 terminating externally of the silo into a chute defining the discharge outlet 20.

Figure 3:
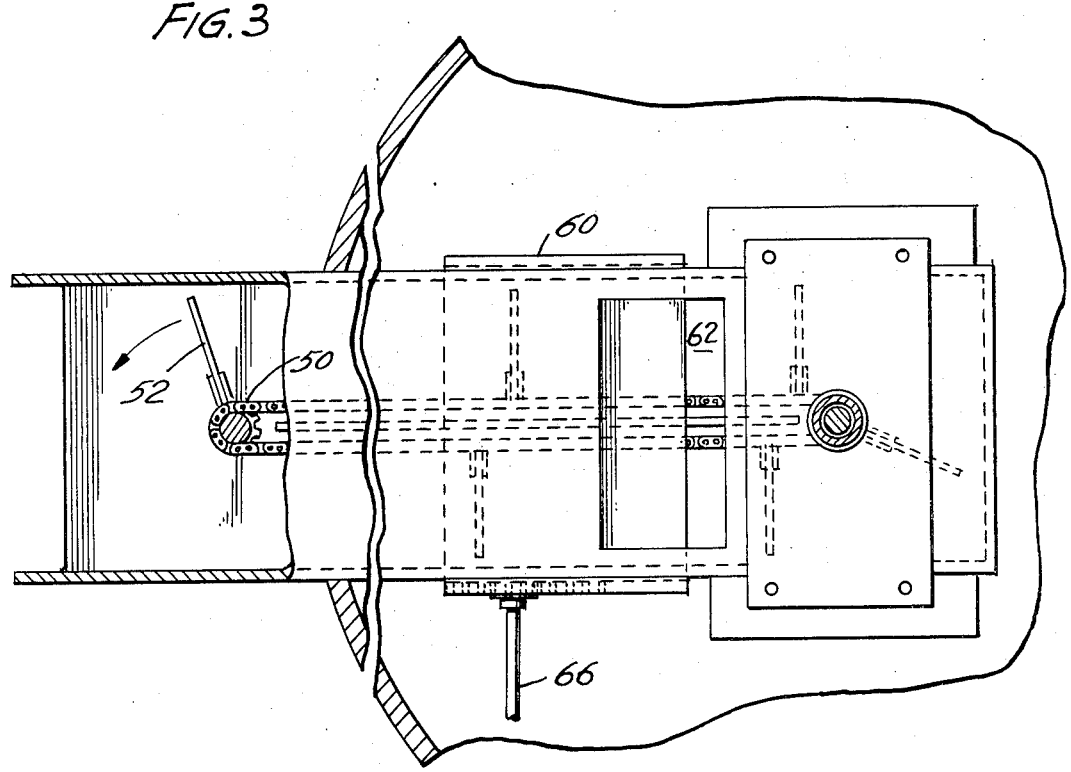
FIG. 3 is a top plan view, partially in section for illustrative clarity, of the conveyor mechanism of the instant invention, said view being taken along lines 3—3 of FIG. 2.

In the preferred inventive embodiment, conveyor mechanism 44 includes an endless chain 50 to which are attached a plurality of vanes or paddles 52 as can best be seen in FIGS. 2 and 3. Vanes or paddles 52 extend outwardly from the chain 50 and the space between any two adjacent vanes 52 defines a conveying compartment adapted to be filled with material and transported out from the silo to the discharge opening 20.

As best depicted in FIG. 2, the endless chain 50 is disposed about the drive gear means or sprocket 40 of the central shaft 22 so that mechanical movement of the chain 50 is coupled to the shaft so as to effect rotational movement thereof. A drive means generally designated by reference numeral 54 and preferably comprising a motor 56 along with a gear train or the like 58 is provided exteriorly of the silo 10 and is mechanically coupled to the endless chain 50 so as to advance same. Motor 56 and its associated gear train or transmission 58 are reversable in a selective fashion, thus enabling the drive of endless chain 50 in both a forward and a reverse direction.

Finally, material can be loaded onto the conveyor mechanism 44, and specifically into each material compartment defined as the space between adjacent vanes or paddles 52 via an adjustable door means 60 slidably disposed beneath an aperture 62 through the housing 46 of the conveyor mechanism. Depending upon the position of the sliding door means 60, a greater or lesser amount of silage will be metered into the conveyor mechanism 44 for subsequent discharge. Importantly, the position of the door means 60 relative to the aperture 62 can be controlled from the outside of the silo by virtue of a mechanical wheel 64 coupled to shaft 66 and rack and pinion gearing arrangement 68. Thus, as the wheel 64 is manually rotated, the door means 60 is slided either to the left or to the right as when viewing FIG. 2, so as to allow a greater or lesser amount of silage to enter the conveyor mechanism 44 or, so as to entirely close the aperture 62 if desired.

During operation of the bottom unloader mechanims as above-described, the door means 60 or metering mechanism would first be set at some desired position through operation of the manual control wheel 64. The motor 56 and associated gear train or transmission 58 would then be set into operation so as to effect advancement of the endless chain 50 of conveyor mechanism 44 thereby discharging silage from the silo through the discharge opening or outlet 20. Advancement of the endless chain 50 simultaneously effects a spinning or rotation of the central shaft 22 and its agitation devices or chains 24, 26 and 28 thereon, so as to agitate the silage within silo 10 downwardly toward the conveyor mechanism 44 and through the aperture 62 in its housing. The relative speed of rotation of the elongated central shaft 22 with respect to the speed of advancement of conveyor 44 can readily be selected by means of the gear-ratio effected by the transmission 58 and the drive gear means or sprocket 40 affixed to the shaft 22. Further, and in the event of jamming or clogging of the silage material within conveyor 44, the motor 56 and/or gear train or transmission 58 can be reversed, thus effecting a reverse advancement of the conveyor mechanism 44 so as to dislodge the jam. It should be appreciated that regardless of advancement direction of the endless chain 50 of conveyor mechanism 44, silage still will be transported from the silo 10 to the discharge opening 20.

It should be apparent from the foregoing detailed description that the objects set forth hereinabove have been successfully achieved. Moreover, while there has been shown and described a present preferred embodiment of the invention, it is to be distinctly understood that the invention is not limited thereto but may be otherwise variously embodied and practiced within the scope of the following claims.

What is claimed is:

1. In a silo of the type having a floor and up-standing sides, a bottom unloader apparatus comprising in combination; an elongated shaft having a plurality of agitator devices thereon; mounting means for rotationally journalling said shaft within the silo about a substantially vertical axis such that said shaft extends upwardly from the silo floor; a drive gear means affixed to said shaft adjacent a lower end portion thereof; a substantially laterally disposed conveyor mechanism extending between said shaft and a discharge outlet exterior of the silo, said conveyor mechanism including an endless chain having a plurality of vanes thereon, said endless chain being disposed about said drive gear means of said shaft; and drive means disposed exteriorly of the silo and coupled to the endless chain to advance same, advancement of said endless chain in either a forward or reverse direction effecting discharge of silage, and simultaneously effecting rotation of said shaft so as to agitate silage downwardly toward said conveyor mechanism.

2. An apparatus as defined in claim 1, wherein said conveyor mechanism is disposed in the silo floor.

3. An apparatus as defined in claim 2, further including a housing disposed about said conveyor mechanism, adjustable door means disposed through said housing for metering a predetermined volume of silage to said conveyor mechanism, and control means actuated exteriorly of the silo for adjusting the position of said door means.

4. An apparatus as defined in claim 3, wherein said agitator devices on said elongated shaft include flexible chains anchored at one end thereof to said shaft.

5. An apparatus as defined in claim 1, wherein said drive gear means comprises a chain sprocket.

* * * * *